US008930138B2

(12) United States Patent
Kadosh et al.

(10) Patent No.: US 8,930,138 B2
(45) Date of Patent: Jan. 6, 2015

(54) NORTH FINDER

(75) Inventors: Igal Kadosh, Kiryat Tivon (IL); Nadav Katzman, Haifa (IL); Michael Naroditsky, Karmiel (IL); Ofir Elya, Hoshaaya (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 0 days.

(21) Appl. No.: 13/704,445

(22) PCT Filed: Jun. 13, 2011

(86) PCT No.: PCT/IL2011/000466
§ 371 (c)(1),
(2), (4) Date: Dec. 14, 2012

(87) PCT Pub. No.: WO2011/158228
PCT Pub. Date: Dec. 22, 2011

(65) Prior Publication Data
US 2013/0090848 A1 Apr. 11, 2013

(30) Foreign Application Priority Data
Jun. 17, 2010 (IL) .......................................... 206459

(51) Int. Cl.
G01C 21/10 (2006.01)
G01C 19/36 (2006.01)
G01C 19/38 (2006.01)
G01C 19/42 (2006.01)

(52) U.S. Cl.
CPC ................ *G01C 19/36* (2013.01); *G01C 19/38* (2013.01); *G01C 19/42* (2013.01)
USPC ........................................................ 701/501

(58) Field of Classification Search
CPC ...... G01C 21/16; G01C 21/165; G01C 17/00; G01C 19/38
USPC .................................................. 701/501, 505
See application file for complete search history.

(56) References Cited

U.S. PATENT DOCUMENTS

| 5,272,922 | A | 12/1993 | Watson |
| 7,412,775 | B1 | 8/2008 | Karnick |
| 8,151,475 | B2 | 4/2012 | Albo et al. |
| 2003/0135327 | A1 | 7/2003 | Levine et al. |
| 2009/0070058 | A1* | 3/2009 | Lin ................................. 702/93 |
| 2009/0089001 | A1 | 4/2009 | Lin |
| 2009/0326851 | A1 | 12/2009 | Tanenhaus |

OTHER PUBLICATIONS

International Preliminary Report on Patentability dated Jan. 4, 2013 corresponding to PCT/IL11/00466, 5 pp.
International Search Report dated Nov. 30, 2011 corresponding to International Patent Application No. PCT/IL2011/000466.
International Preliminary Report on Patentability from International Application No. PCT/IL11/00466 dated Jan. 4, 2013.

* cited by examiner

*Primary Examiner* — James Trammell
*Assistant Examiner* — Michael D Lang
(74) *Attorney, Agent, or Firm* — Ohlandt Greeley Ruggiero & Perle L.L.P.

(57) ABSTRACT

An attitude determination system provided with North-finding capability, comprises: a) a stage consisting of a rotating platform provided with a high precision positioning controller; b) an Inertial Navigation System (INS) comprising inertial sensors, wherein said inertial sensors comprise gyroscopes and accelerometers, and wherein at least one gyroscope is of a precision suitable to find the direction of true North; and, c) a control unit for controlling input signals and output signals of the stage and the INS and combining the signals in order to provide attitude data of the system.

8 Claims, 2 Drawing Sheets

NORTH FINDER

FIELD OF THE INVENTION

The present invention relates to a system and method for determining the position and orientation of a body relative to both a local and a general Earth based coordinate system.

BACKGROUND OF THE INVENTION

Many ground-based systems require knowledge of the attitude (true-heading, pitch and roll) in which the elements are positioned relative to earth. In order to obtain accurate attitude information it is necessary to find the true North. It is well known in the art to use gyrocompasses and staged gyros to find the North by measuring the direction of Earth's axis of rotation.

North-seeking devices are typically a compass consisting of a motor-operated gyroscope whose rotating axis, kept in a horizontal plane, takes a position (attitude) parallel to the axis of the earth's rotation and thus points to the geographical north pole instead of to the magnetic pole. Illustrative examples of such systems, which also describe details of operation of conventional systems can be found, for instance, in U.S. Pat. No. 5,272,922 and in U.S. Pat. No. 7,412,775, the description of which is incorporated herein by reference. The principle described in said patents can be referred to as a mechanical gyrocompassing system.

Mechanical gyro compassing systems and apparatus present two main disadvantages, inasmuch as they require long calibration times of the order of minutes, before the North can be found. This is due to the fact that the rate of change of the gyroscope's angular momentum vector equals the applied torque, and therefore a gyroscope having a large angular momentum vector influenced by a comparably small torque requires significant time to align the angular momentum vector with the axis of rotation producing the torque. Secondly, because of the high precision required, sophisticated and extremely expensive gyroscopes must be used.

Another well established and widely used methodology for north finding relies on the use of one or more rate gyros mounted on a stage/indexing table. The stage/indexing table is positioned on a leveled platform (leveling can be computed by using accelerometers). The rate gyros sense the component of the earth rotation vector in several directions (using stage/indexing) and the north direction is derived, using numerical computations. This methodology requires static conditions for the platform during the process of north finding, and normally takes several minutes before a converged solution is achieved. This method is usually referred to as a "staged gyros north finding".

Generally speaking, staged-gyros north finding achieves a given accuracy faster than the older technology of mechanical gyro compassing. A profound limitation of the north finding technique, however, is the need for static conditions during operation. Even small changes in the attitude of the platform cause the need for recalculation of the north direction.

As will be easily appreciated, systems which require frequent finding of the North in quick succession are severely hampered by the need to allow for long calibration times. For instance, artillery may need precise directional knowledge, between consecutive firings It is an object of the present invention to provide an improved system that allows using North data without requiring long calibration periods after each dynamic movement. The present invention improves the capabilities and performance of north finders based on the staged gyros north finding technique. Fast reaction to dynamics is a key feature of Inertial Navigation Systems (INS), but the cost of these systems is high. The present invention bridges the gap between a conventional North Finder and an expensive INS, by offering a high accuracy attitude solution with a fast reaction to dynamics and at a relatively low cost.

It is another object of the invention to provide a system that overcomes the aforementioned drawbacks of the prior art, which is relatively inexpensive and robust.

Other objects and advantages of the invention will become apparent as the description proceeds.

SUMMARY OF THE INVENTION

The invention relates to an attitude determination system provided with North-finding capability, comprising:
a) a stage consisting of a rotating platform provided with a high precision angular positioning controller;
b) an Inertial Navigation System (INS) comprising inertial sensors, wherein said inertial sensors comprise gyroscopes and accelerometers, and wherein at least one gyroscope is of a precision suitable to find the direction of true North; and,
c) a control unit for controlling input signals and output signals of the stage and the INS and combining the signals in order to provide attitude data of the system.

The term "attitude", as employed herein, includes the Azimuth, Pitch and Roll. The term "navigation", as used herein, refers to the Position, Velocity and Attitude.

In another aspect the invention relates to a method for providing navigation solution (position, velocity, attitude—PVA) data to a non-stationary system, comprising:
i) providing a stage consisting of a rotating platform provided with a high precision positioning controller;
ii) providing an Inertial Navigation System (INS) comprising inertial sensors, wherein said inertial sensors comprise gyroscopes and accelerometers, and wherein at least one gyroscope is of a precision suitable to find the direction of true North;
iii) providing a control unit for controlling input signals and output signals of the stage and the INS and for combining the signals in order to provide PVA data of the system;
iv) determining the true North using said suitable gyroscope; and
v) recording a change of position of the body to which the system is attached using said INS and thereby determining its current position relative to its previous position.

DETAILED DESCRIPTION OF THE INVENTION

Figure 1:
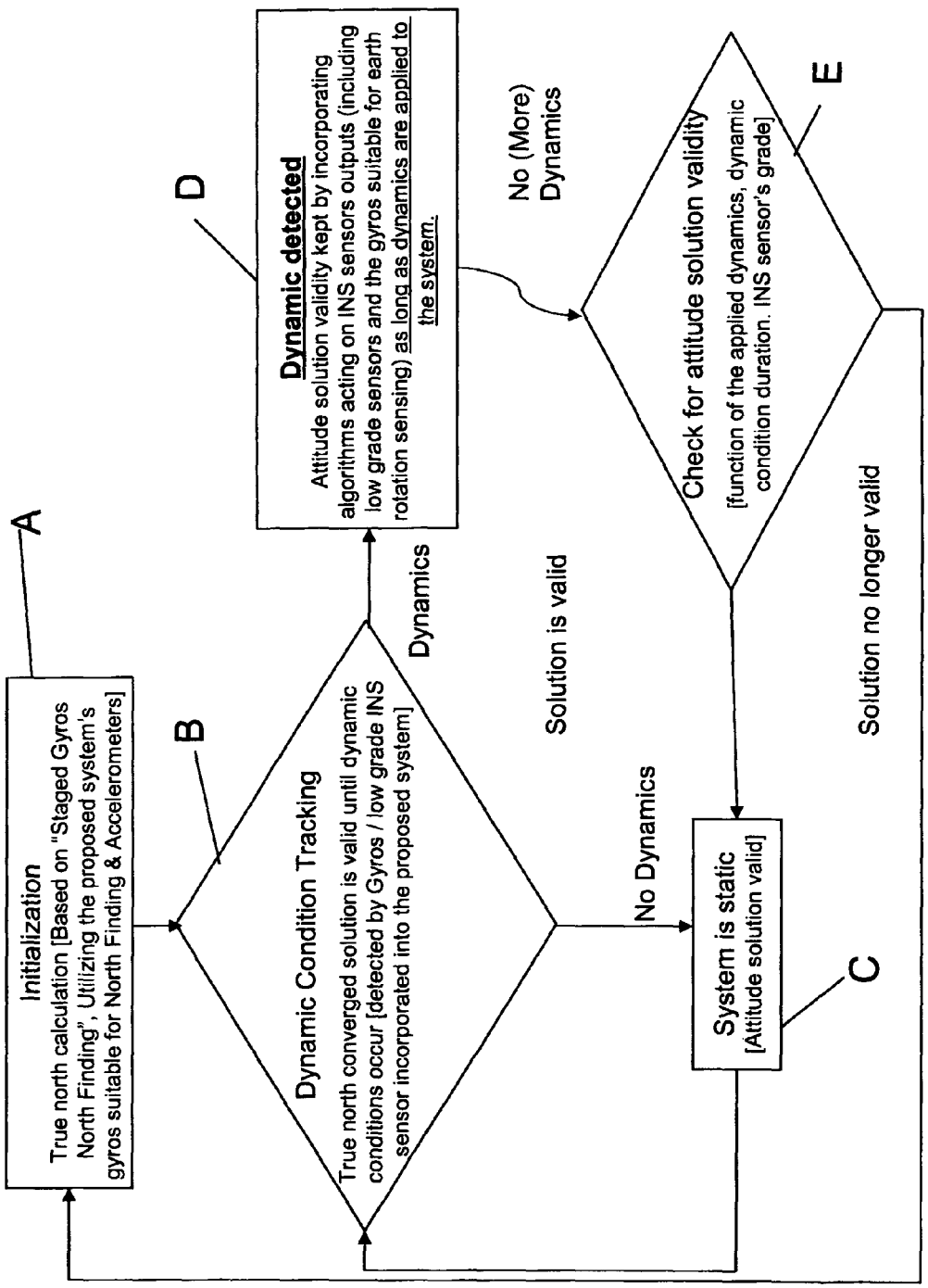
FIG. 1 illustrates the general concept of the system, specifying the process of achieving and maintaining a converged attitude solution under alternating static and dynamic conditions.

A typical INS (Inertial Navigation System) normally consists of at least 2 gyroscopes and 3 accelerometers that provide position data. Modern INS are typically of a Strap-Down type—i.e., the gyros and accelerometers are mechanically mounted on the casing of the INS (in contrast to gimbaled sensors). Typical modern gyroscope types may include MEMS (Micro Electro Mechanical Sensors), FOG (Fiber Optic Gyroscope) and RLG (Ring Laser Gyroscope). An INS is capable of providing Position, Velocity and Attitude (PVA) data by manipulating the outputs of Gyros and Accelerometers. When static, the INS initial attitude is acquired by means of a process called gyrocompassing. The gyrocompassing in modern INS systems is based on the calculation of the attitude by measuring the gravity and earth rotation vectors, utilizing the gyros and accelerometers. Once a static system has acquired its initial attitude, the INS uses numerical manipulations of its sensors readouts to track any dynamic changes so as to provide continuous PVA solution. Initial position is either assumed by the system, or supplied externally. Since all sensors are prone to errors, once a system is no longer static and changes are measured relative to the initial state, the inaccuracy of the continuous PVA data drifts with time. Typically for modern systems, GPS signals are used to limit the maximum total error of an INS to constant values, through a process named transfer alignment. GPS, however, is not available underground or inside tunnels and structures and is not effective for tracking small short term movements.

The present invention comprises a modified North Finding System (NFS), which includes a mono-axial stage, and in which at least one of the gyroscopes is a high-precision gyroscope, such as a FOG-based gyroscope. As will be apparent to the skilled person, such high precision gyroscopes are not needed to operate a conventional low-grade INS, and therefore the resulting system, which may be termed a "hybrid" system, is novel both in concept and in operation.

In one embodiment of the invention, therefore, the system comprises:
  a stage—a rotating platform with a very high precision angular position reading;
  an INS consisting of inertial sensors such as gyroscopes and accelerometers, wherein at least one gyroscope is used in the process of finding the direction of true North; and,
  a control unit for controlling input signals and output signals of the stage and the INS and combining the signals in order to ascertain attitude data of the system.

As explained above, the INS is mounted on a stage and the signals of the high quality and precision gyroscope are used in conjunction with the stage's signals for finding the direction of true North, while the whole system itself is static. Thus, accurate attitude data are ascertained and can be used to initialize the INS and provided to a body to which the system may be attached.

When the body begins a dynamic inertial maneuver, throughout which the direction of true North seeking ability is no longer available, the whole INS is used to track the inertial momentum changes and ascertain the resulting relative positioning changes from the initially calibrated positioning data. Thus, high accuracy continuous position tracking is achieved both at rest and during movement of various natures for the system and a body to which it may be attached, and this task is performed at low costs and with the use of minimal resources when compared to the prior art.

Figure 2:
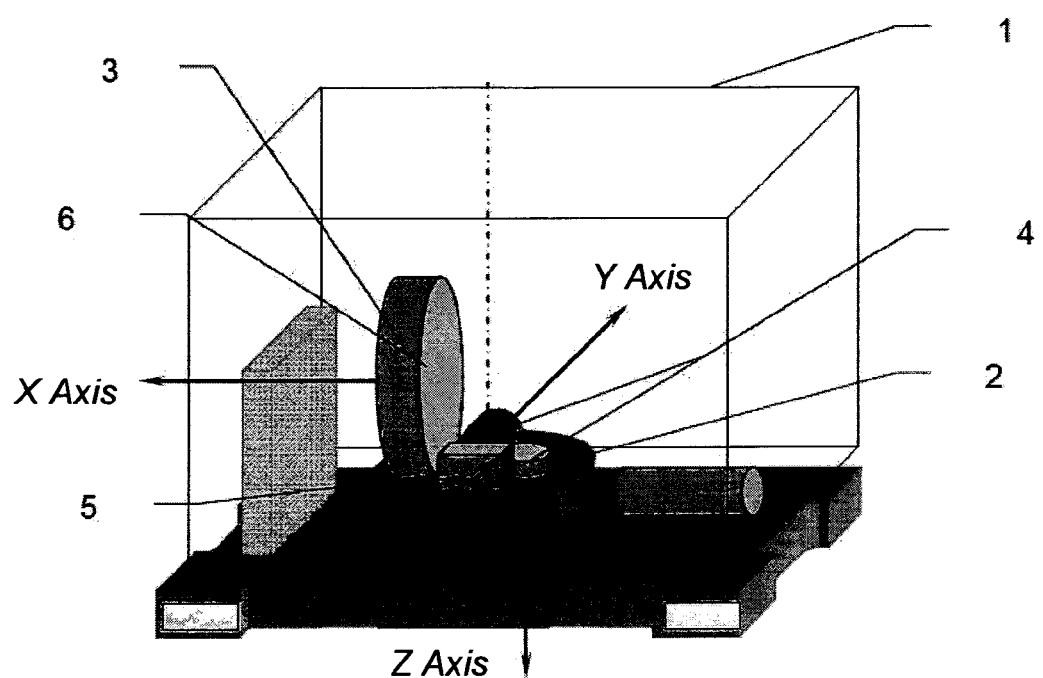
FIG. 2 illustrates the main components of the system.

With reference now to FIG. 2, the main system components are schematically shown. System case 1 defines the axes of the system to which the attitude solution is related. The case may include various accessories for accurate system axes determination (e.g. mirrors 7). Motorized Stage 2 is used for rotating the other components mounted on the rotating disk to predefined angles, and to read the actual rotation angle of the disk relative to the case. High Precision Gyro 3 is of suitable grade to measure the earth rotation rate. At least one such gyro per system is required. Low precision Gyros 4 are used for complementing the High precision gyros to a three axes orthogonal Cartesian system (to cover all three rotational degrees of freedom). Three Axes Accelerometers 5 are used for sensing acceleration (specific force) in a three axes orthogonal Cartesian system (to cover all three linear degrees of freedom). Control Computation Unit 6 manages the operation of the motorized stage (1), sensor sampling, algorithms execution and communications.

The process of achieving and maintaining a converged solution of the true north is schematically illustrated in FIG. 1. BLOCK 'A' describes the initialization process based on "staged gyro compassing", during which the angular velocity of the Earth ($\omega$), as measured by the higher grade gyro incorporated into the system from several angles, is determined. This process is used to determine the angular deviation ($\psi_{(t)}$) of the system's case/body to which the case is attached to from the true North ($\psi_0$). That deviation from true north, as estimated in the process describes above, utilizing the system's sensors, can be referred to as "converged solution" (azimuth/heading/ . . . ). Performance wise, that solution defines the system's accuracy of North finding. After the initial solution is obtained, is it used as an 'initial condition/continuous reference data' for maintaining it, by using other algorithmic manipulations, as will be described hereinafter (e.g. strap-down navigation and sensor errors estimation algorithms). After those algorithms start running they are kept running for as long as the system operates, even during re-initialization (BLOCK A) which may improve their performance (to be exact, only one initialization is required to start the said algorithms, which are kept running even if and when another north-finding initialization is performed for accuracy improvement).

BLOCK 'B' describes the process of maintaining the converged solution under the assumption of zero movement of the system. Also, a full navigation solution (system attitude and (relative) position) is calculated in the background, utilizing the gyros and accelerometers. The dynamic condition to which the system is exposed is continuously monitored by analyzing the signals obtained from the system's sensors. For as long as there are no dynamic conditions and the system is STATIC [BLOCK 'C'] the solution maintained from the initialization process applies. Once a system movement is detected, the initial condition and the zero movement assumption are held invalid, and the system goes into [BLOCK 'D'].

Block 'D' describes the system's state at which dynamic conditions are applied to the system, involving velocities and displacements of the system, which render the initial solution invalid. Such dynamics may, for example, originate from an artillery gun when a shot is fired, one of several consecutive firings for example, during which the attitude solution of the system must be maintained regardless of the dynamics involved in such firing. Under applied dynamics, the system's attitude solution is maintained by utilizing the navigation solution kept current to the time of the beginning of the dynamic occurrence in the background, and by continuing that calculation in real time (such as a strapped-down navigation algorithm) an attitude solution is kept valid for as long as the solution's inaccuracy is acceptable, dynamics apply and time permitting. Once an indication for a static condition exists, the system goes into [BLOCK 'E'].

In block 'E' the current attitude solution's validity is evaluated. During dynamics, and when the assumption of zero movement is not valid, the position and attitude solution of the system is degraded as a function of time. The reason for this time-dependent inaccuracy is output errors inherent to the lower grade sensors (gyros and accelerometers). In a strap-down navigation algorithm for example, it is known for the position solution to diverge relative to the third power of time. Taking the system's error model into account, after a long time of maintaining the solution via algorithms that utilizes the lower grade sensors, the attitude solution's accuracy may be degraded to a level not acceptable by such a system (user and application dependent) and the system may go into [BLOCK 'A'] for a new converged solution calculation as described above. In cases where dynamics apply for relatively short times between consecutive zero movement states of the system (such as but not limited to movement due to gun shots), the suggested system may go back to [BLOCK 'B'] and maintain the attitude solution under the relevant assumptions once again and thus extends the scope of abilities offered by the prior arts, giving a continuous and complete attitude solution under alternating dynamic and static conditions.

Following the processes described above it is no longer necessary to frequently reinitialize the North finding solution at each and every change of the system state. Of course, time permitting it may be desirable periodically to recalibrate (initialization, block 'A') the system by performing a full North finding procedure, in order to improve the system's accuracy.

As will be appreciated by the skilled person the invention provides a simple and inexpensive way to overcome the drawbacks of the prior art. Of course, the above description has been given for the purpose of illustration and is not meant to limit the invention in any way, except as defined in the claims to follow.

The invention claimed is:

1. An autonomous attitude determination system provided with True-North finding capability, comprising:
   a) an inertial-type True North finding unit which comprises a rotating stage, at least one high precision gyroscope, at least one accelerometer, and a north finding calculation algorithm;
   b) an INS unit which comprises, as an integral part, said at least one high precision gyroscope and at least one associated accelerometer of said North finding unit, and further comprises additional gyroscopes and additional accelerometers that complement said INS unit to include a total of three perpendicular gyroscopes and three perpendicular accelerometers, said INS unit further comprise an INS calculating algorithm;
   wherein during a static state the attitude determination system outputs attitude relative to the True North as calculated by said True North finding algorithm, while said True North finding unit further provides during said static state initial conditions to said INS unit;
   and wherein during a dynamic state, said attitude determination system outputs attitude direction as calculated by said INS calculation algorithm of said INS unit, which in turn also uses said initial conditions as provided from said True North finding unit.

2. The system according to claim 1, wherein during a dynamic state, the INS unit further outputs velocity and position.

3. The system according to claim 1, wherein transfers from a static state to a dynamic state or from a dynamic state to a static state are determined by said INS sensors.

4. The system according to claim 1, further comprising a monitoring unit which verifies validity of the attitude determination, and upon detection of poor accuracy, the system performs, if conditions allow, a static-state initialization which involves new determination of the True North by the True North finding unit.

5. An autonomous method for determining a True-North and attitude during static and dynamic states, which comprises:
   a) providing an inertial type True North determination unit, which comprises a rotating stage, at least one high precision gyroscope, and at least one accelerometer, and further providing a North finding calculation algorithm for determining the true north based on settings of said True North determination unit;
   b) providing an INS unit, which comprises as an integral part, said at least one high precision gyroscope and at least one associated accelerometer of said True North finding unit, and which further comprises additional gyroscopes and additional accelerometers that complement said INS unit to include a total of three perpendicular gyroscopes and three perpendicular accelerometers, and further providing an INS calculation algorithm; and
   c) during a static state calculating and determining by said North finding algorithm an attitude relative to True North, and further providing to said INS unit during said static state said determined attitude relative to the rue North as an initial condition; and
   d) during a dynamic state, calculating and determining by said calculation algorithm of said INS unit an attitude direction, while using in said calculation the initial conditions as provided by said True North finding unit.

6. The method according to claim 5, further determining by the INS unit position and velocity.

7. The method according to claim 5, further determining transfers from a static state to a dynamic state or from a dynamic state to a static state using sensors of the INS unit.

8. The method according to claim 5, further comprising a step of monitoring and verifying the validity of the attitude determination, and upon detection of a poor accuracy, performing a static-state initialization, which involves new determination of the True North by the True North unit.

* * * * *